United States Patent [19]

Schmitt

[11] 3,966,536
[45] June 29, 1976

[54] TIRE BUILDING MACHINERY

[75] Inventor: Otto Schmitt, Niedergrundau, Germany

[73] Assignee: Dunlop Limited, London, England

[22] Filed: May 7, 1974

[21] Appl. No.: 467,814

[30] Foreign Application Priority Data
May 15, 1973 Germany............................ 2324570

[52] U.S. Cl. .............................. 156/401; 156/132; 156/416
[51] Int. Cl.² ........................................ B29H 17/12
[58] Field of Search ........... 156/110, 123, 124, 128, 156/128 T, 131, 132, 394, 400, 401, 414, 415, 416, 133, 135, 399, 403; 152/361 FP

[56] References Cited
UNITED STATES PATENTS

| 2,084,009 | 6/1937 | Sohl .................................. 156/416 |
| 2,814,331 | 11/1957 | Vanzo et al. ......................... 156/416 |
| 3,018,213 | 1/1962 | Kraft .................................. 156/416 |
| 3,044,533 | 7/1962 | Lowe ................................. 156/416 |
| 3,138,510 | 6/1964 | Hindin et al. ..................... 156/416 X |
| 3,265,549 | 8/1966 | Woodhall et al. ................... 156/416 |
| 3,386,875 | 6/1968 | Grote ................................. 156/416 |
| 3,418,192 | 12/1968 | Nadler ............................... 156/401 |
| 3,525,655 | 8/1970 | Wood et al. ......................... 156/123 |
| 3,547,734 | 12/1970 | Read .................................. 156/416 |

FOREIGN PATENTS OR APPLICATIONS

| 231,357 | 1959 | Australia ............................ 156/132 |
| 1,000,262 | 8/1965 | United Kingdom ................. 156/416 |
| 1,136,630 | 12/1968 | United Kingdom |
| 930,801 | 7/1963 | United Kingdom |

Primary Examiner—Douglas J. Drummond
Assistant Examiner—John E. Kittle
Attorney, Agent, or Firm—Stevens, Davis, Miller & Mosher

[57] ABSTRACT

A folding bag comprises an inflatable tube supported on a cylindrical support, the tube being secured on both sides to two cord ply arrangements consisting of at least two intersecting plies, the angle of intersection of the first cord ply arrangement being greater than that of the second cord ply arrangement. One end of the bag formed by the tube and the two cord ply arrangements terminating flush with one end of the support and being fixed relative to said end. The support side cord ply arrangement being restrained on the support at a predetermined distance from the support end, a restoring device being secured to the free end of the bag.

18 Claims, 7 Drawing Figures

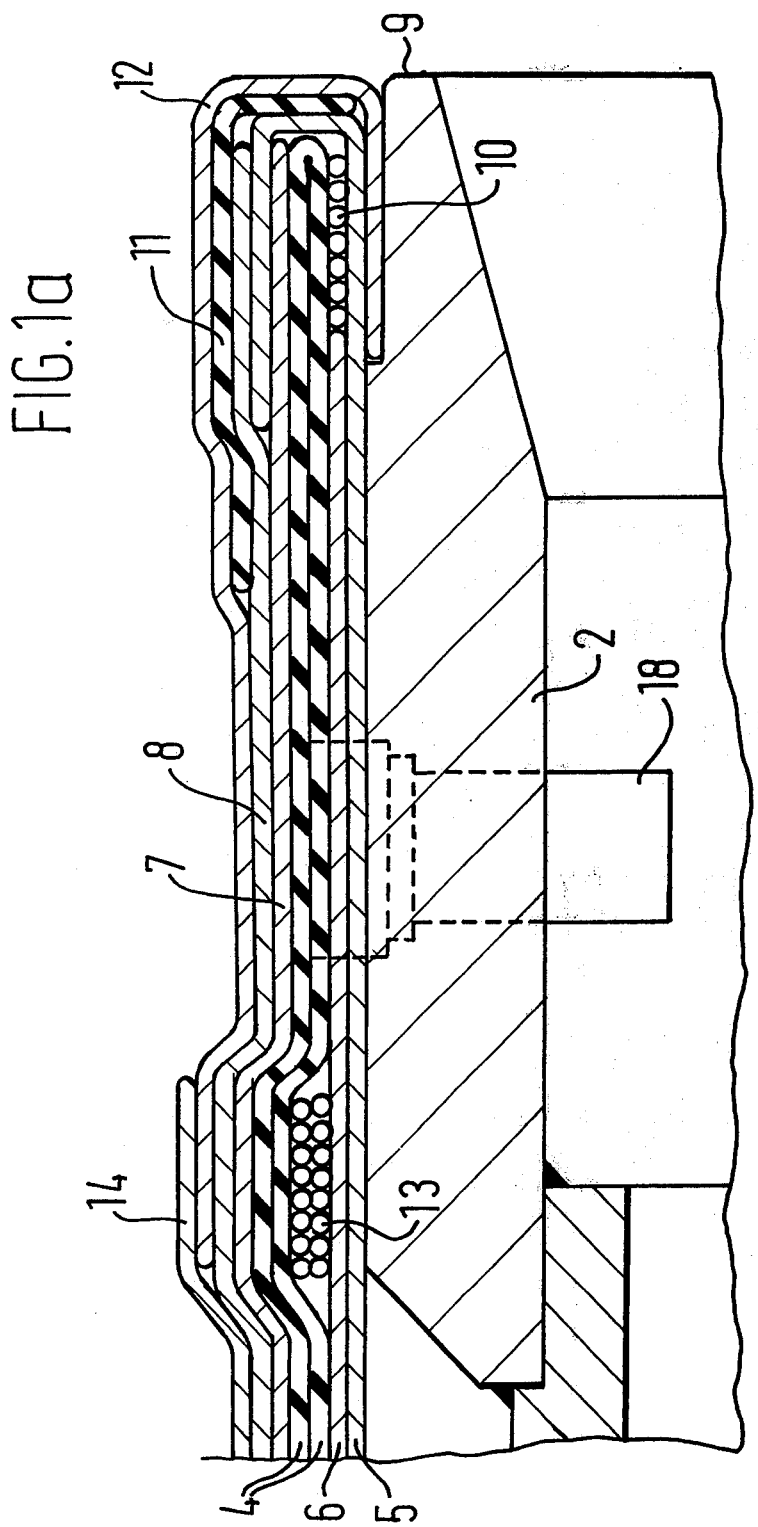

TIRE BUILDING MACHINERY

This invention relates to a folding device comprising an inflatable bag which is supported at least partially on a cylindrical support and which is controllable by inflation from a flat-ring-shaped state into a toroid-shaped state.

Inflatable bags are frequently used in tire building in order to fold plies or to carry out various other folding operations such as breaker folding operations during carcass building. It is known to use, for this purpose, so-called double bag, which consist of a rolling bag and support bag which controls the direction of the pressures that are exerted and ensures that the bag return to their initial state on completion of the operation. The use of double bag has the disadvantage that they take up a lot of space and require a comparatively long working period.

One object of the invention is to avoid the disadvantages of the known bags and accordingly to provide a bag which saves space and is operationally reliable and which may be worked rapidly.

According to one aspect of the present invention a folding device comprises a folding bag which is inflatable from a flattened, cylindrical shape to a toroidal shape, and is supported at least partially on a cylindrical support, one end, referred to as the fixed, or support end of the bag lying substantially flush with one end of the support, the bag being secured to the support at a point adjacent said end and at a point intermediate the ends of the bag, wherein the bag comprises an endless flexible-walled tube having on its inner periphery a first reinforcing layer and on its outer periphery a second reinforcing layer, each of said reinforcing layers comprising two layers of oppositely disposed bias-cut cord plies, the bias angle of the cords of the plies of the first reinforcing layer being greater than that of the second reinforcing layer, a restoring device being secured to the end of the bag remote from said fixed end. By "ends" of the bag we mean points corresponding to the ends of the bag when in its deflated cylindrical form. The end of the bag remote from the fixed or support end is referred to as the free end. "Bias angle" is defined as the angle of the cords of the ply relative to the circumference.

Through the measures in accordance with the invention, above all the result of the above construction is that a supporting bag becomes superfluous, since the folding bag is arranged to be movable forwards and backwards to assume clearly defined positions which depend solely on the inflation pressure.

Preferably the bias angle of the plies of the first reinforcing layer is about 90°, and more especially 88°, and that of the second reinforcing layer is approximately 40°, and more especially 38°. The layers may be of materials conventionally used for folding bags used in tire building, e.g. tire cord fabric.

A clamping wire which is wound in the form of several windings about at least one ply of the first reinforcing layer may be provided to fix the bag to the support end, while one or more windings (referred to as the "holding wire") may be provided to secure the bag at the intermediate point.

Advantageously the clamping wire embraces only the ply resting on the support, the end of this ply being folded over and secured to the plies of the second reinforcing layer.

A clamping band may be provided on the positionally-fixed end of the bag to engage over the surface of the bag and extend opposite the clamping wire at least over the axial length thereof and may be secured to the cord plies of the first reinforcing layer.

Preferably this clamping band has an initial stretch of approximately 100%. The inherent force of the clamping band acts normally radially inwards. With the bag inflated, the clamping band forces are, however, converted into at least partially axially acting forces, which assist roll-back movement of the bag on lowering of the internal pressure of the bag.

The bag is preferably covered, at least in the region situated between the clamping end and holding wire, with a fabric having a low coefficient of friction. By this means it can be ensured that little friction occurs at the contact surface between the folding bag and for example a breaker that is to be folded.

Preferably the restoring device at the free end of the bag comprises at least one elastic member, which is cylindrical and which is secured in an overlapping manner to the end of the bag.

Preferably a further cylindrical sleeve is secured on a part of its length to the restoring sleeve and is situated on the outer periphery of the free end of the cylindrical restoring sleeve. This measure serves more especially to increase the restoring force and also to speed up the restoring procedure.

Preferably several compressed-air connections are provided in the region between the clamping wire and holding wire. The compressed-air connections, which extend through the support member, protect the bag on the support member against lateral shearing forces which can occur during operation. The cross sectional area of the connections and the pressure ratios are suitably selected to ensure that the procedure of filling and venting the folding bag can be effected rapidly.

The cylindrical support may, if desired be provided with a portion of reduced diameter (shoulder), the part having the smaller diameter being situated on the side of the free end of the bag.

The presence of this shoulder facilitates, on the one hand, the mounting, i.e., the application of the bag to the support and gives, on the other hand, sufficient freedom of movement to the restoring clamping sleeves, which when in operation are drown axially towards the support.

Preferably the mutual spacing of clamping wire and holding wire is dimensioned in such a way that, with the bag in a pressure activated state, the tilting point corresponding to the highest point still lies within the region of the support in front of the frontal terminal plane or rolling edge. The dimensioning depends upon the overall construction of the bag and can be satisfactorily determined by experiment.

An advantageous method for the folding of breakers, more especially steel cord breakers during the building of pneumatic tires with the use of bag in accordance with the invention is characterised in that the carcass is dished and is centered between bells which serve as the support for the bag, the breaker being subsequently applied and fastened to the intended fold lines by stitching and by subsequent inflation of the bag, the breaker plies which project over the balls are folded over and are pressed by the inherent tension of the folding bag securely against the breaker and finally, after relieving the pressure of the folding bellows the folding bag is restored to its original state and the folded breaker is stitched.

The folding of the steel cord breaker during the building on the carcass makes possible a particularly accurate centering of the breaker and thereby conntributes positively to the tire uniformity. This direct folding of the breaker on the carcass is in practice made possible by the folding bag in accordance with the invention, in which connection the inherent adhesive action of the breaker preparation on the carcass is utilized.

Preferably the stitching of the breaker on the intended folding lines is undertaken by means of two profiled rollers, set to the exact width of the protector rolling device, or a device known as a Static Stitcher.

The spacing of the bell edges from the respective profiled rollers is advantageously selected so as to be equal to the single breaker material thickness. This has an advantageous effect on the accuracy of the building procedure.

The folding device in accordance with the invention can advantageously be used in all those cases where previously work has been effected with a double bag. It is suitable by way of example upon the carcass construction for the application of plies and also for the application of intersecting folded steel cord reinforcements, which are stitched directly to the carcass. In all these cases, the previously necessary second bag, namely the support bag, is avoided and, in addition to this, a more exact and more rapid working is made possible.

Various embodiments of the invention will now be described by way of example only, with reference to the accompanying drawings, in which:

FIG. 1a is an enlarged view of one end of the device shown in FIG. 1.

Figure 1:
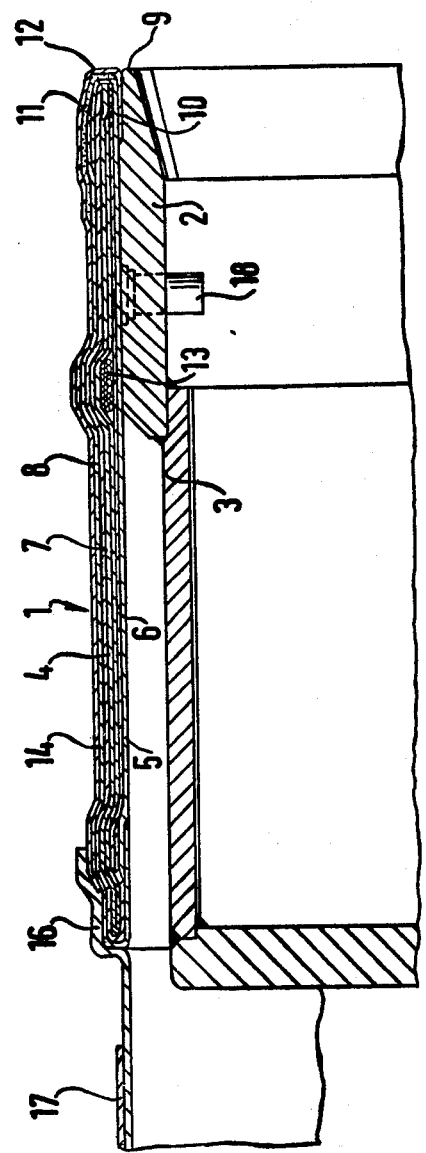
FIG. 1 is a diagrammatic partial sectional representation of a folding device, in accordance with the invention, in the unpressurized state.
Figure 2:
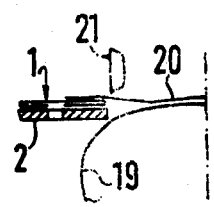
FIGS. 2 to 7 show a succession of representations to illustrate the method, in accordance with the invention, for the use of the folding device upon the building of pneumatic tires.

In accordance with FIGS. 1 and 1a, the bag identified with the general reference number 1 is arranged on a cylindrical support 2, which is reduced in diameter to provide a shoulder 3. The cylindrical support 2 shown, is a bell used in the case of tire building, but it has to be stressed that this is only a preferred instance of application in accordance with the invention.

The bag 1 comprises an inflatable annular tube 4, which is covered on its underside and on its upper side by reinforcing layer. The first, or support-side layer comprises an inner cord ply 5 and an outer cord ply 6, in which connection the threads of these cord plies intersect and extend at an angle of 88° relative to the periphery.

The second cord ply arrangement which is connected to the outside 1 of the tube 4 consists of an inner cord ply 7 and an outer cord ply 8, the intersecting threads of which extend, with regard to the periphery, at an angle of 38°.

The bag 1 terminates flush with the end of the support 2, where it forms a rolling edge 9.

At the rolling-edge end of the support 2 the bag 1 is fixed in its position by means of a clamping wire 10. This clamping wire 10 consists preferably of a tire bead wire which is coated with rubber and which is placed in a spiral and in a single-layer around the support-side cord ply 5 and in this way ensures a positive location of the bag. The aforesaid cord ply 5 is folded-over upwards at the rolling-edge end and is connected securely to the upper cord plies 7, 8.

Furthermore, situated at the rolling-edge end of the bag 1 is a clamping band 11, which engages over the front surface of the bag and extends opposite the clamping wire 10 at least over the axial length thereof and is connected securely to the cord plies 5, 7 and 8 surrounding the tube 4. This clamping band 11 possesses an initial stretch of 100% and becomes effective above all upon the bag restoration that is still to be described.

A fabric 12, having a low coefficient of friction, covers the bag 1 at least in the region between the rolling edge and a holding wire arrangement 13. At the support end the fabric 12 is preferably folded downwards about the bag and rests directly on the support 2.

The holding wire arrangement 13 consists of a wire which is wound in a two-layer manner and which embraces the support-side cord plies 5, 6 at a predetermined distance from the clamping wire and locates this relative to the support 2. The purpose of the holding wire 13 is to control the extent of the over-rolling of the folding bag 1 over the roll-over edge 9. This control is effected in such a way that the folding function is carried out in a satisfactory manner and ensures that the folding bag is automatically returned to the initial position on removal of the inflation pressure.

The surface of the folding bag 1 in the region between holding wire 13 and free end is substantially masked by an outer rubber cover 14.

At the free end of the folding bag 1 the upper cord plies 7, 8 are folded over downwards and are connected at the support side to the lower cord plies 5, 6.

A restoring device is provided at the free bag end of the bag which consists of a substantially cylindrical rubber sleeve 16 which is connected securely by one of its end regions to the outer surface of the end of the bag. The diameter of this rubber sleeve corresponds substantially to the internal diameter of the cylindrical bag when in the uninflated state.

A further elastic sleeve 17 is situated on the cylindrical rubber sleeve 16 which, starting from its end adjacent the bag is fastened on a part of its axial length to the sleeve 16. These two sleeves 16 and 17, also to be designated as restoring clamping bands, serve, in a manner still to be explained, to restore the bag out of its over-roll position, when the compressed air escapes from the tube 4.

The bag 1 is represented with the restoring sleeves 16, 17 in FIG. 1 in a state corresponding to the finished construction, and the sleeves 16, 17 will after the return of the bag out of its over-roll position naturally find themselves beneath the lower cord plies 5, 6. For this reason the support is also provided with the shoulder 3, in order to provide clearance for the movement of these restoring rubber sleeves 16, 17. In addition to this, the shoulder assists in simplifying the operation of mounting the bag.

Several valves 18 which are distributed over the periphery of the cylindrical support 2 are provided for the feed of compressed air to the tube 4, the valves also serving to secure the bag 1 against lateral shearing forces which can occur during the folding procedure.

An essential feature of the folding bag in accordance with the invention consists in that the transition from one operational state into another can be effected all of a sudden, which in turn postulates that connection cross-sectional areas of the connection and pressure conditions have to be selected optimally, in order to guarantee rapid filling and exhausting of the bag.

The contact surface between the restoring clamping sleeve 16 and the bag 1 as well as between the two restoring clamping sleeves 16 and 17 have to be kept slidable, and this can be effected by way of example by coating the contacting surfaces with paraffin oil. Furthermore it is important that the contact surfaces between bag 1 and a ply that is to be folded or a breaker fabric that is to be folded are capable of sliding relative to each other. For this reason, the fabric 12 is provided, which at all times has the property of keeping itself slidable.

In operation, compressed air is fed to the tube 4, and the tube 4, which is fastened on one side to the support 2, expands, the bias-cut cord plies 5, 6 and 7, 8 offering resistance to the movements of the tube. The outer wall of the tube 4, covered with the second reinforcing layer, expands more than the inner wall, since the plies of the second layer have a bias angle of 38° and are thus more extensible than the almost inextensible 88° plies of the first, inner, layer.

In further expansion of the bag, the restoring sleeves 16 and 17 come into abutment against the bag until a highest expansion point, to be designated as the tilting point, is reached. The bag 1 is then turned suddenly over the rolling edge 9, and in doing so folds over, e.g., a breaker (not shown in FIG. 1) or a corresponding ply by virtue of the existing inherent tension. The degree of the over-rolling of the bag 1 over the rolling edge 9 is controlled by the holding wire 13.

In order to return the bag to its original position, the air is exhausted from the tube 4. The clamping band 11 and the restoring clamping sleeves 16, 17, whose function is to return the bag to its original position upon release of the pressure, then becomes effective. The initial radial forces exerted by these members are converted into resultant outwardly or substantially axially acting forces, which cause the folding bag to spring back once more into the initial position. Through suitable choice of the angles of the cord plies 5, 6, 7 and 8, the dimensioning of the clamping band 11 and of the clamping sleeves 16, 17 as well as the position of the holding wire 13 relative to the clamping wire 10, the optimum working conditions can be determined to guarantee a sudden rushing forward and springing back of the bag and the execution of a folding operation.

A method for the folding of breakers, more especially steel cord breakers used in the building of pneumatic tires and the use of the folding device in accordance with FIG. 1 is explained hereinafter with reference to FIGS. 2 to 7.

A shaped carcass 19 is centered by two bells which guarantee a peripheral limitation of this carcass and of which only one is partially shown, the other being of symmetrical construction. At the same time, these bells guarantee a lateral location and support of the outer region of a breaker 20 which is applied to the carcass by stitching the breaker or breaker ply onto the carcass 19.

After the laying of the breaker, that is to be folded, onto the centered carcass 19 the breaker ply is adhesively secured to the intended folding edge on the shaped carcass 19, by stitching on this folding line by means of two profile rollers 21 (only one is shown) which are preset to the required positions. Outside the rollers 21, namely with a distance of a single thickness of breaker material are positioned the edges of the bells, which in practice form the rolling edges for the folding bag 1.

Figure 3:
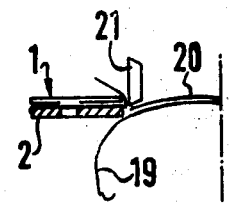

FIG. 3 shows the attachment of the breaker ply 20 to the intended folding line in the immediate vicinity of the bell edge.

Figure 4:
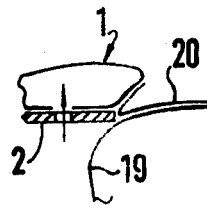
Figure 5:
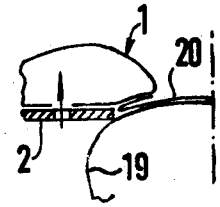

FIG. 4 shows the folding bag 1 in the partially pressurized state prior to turning over, while FIG. 5 shows the filled folding bag 1 after turning over has been effected. The pressing of the folding portions of the breaker is effected in this state through the inherent tension of the bag 1, which ensures that the breaker is firmly pressed-on.

Figure 6:
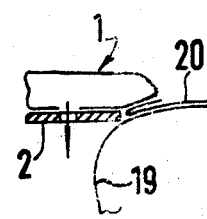

FIG. 6 shows the folding bag 1 during the deflation, but still prior the the springing back. This springing back, already described in connection with FIG. 1, automatically takes place without the assistance of further mechanisms, caused by the construction of the folding bag, at a specific state of deflation.

Figure 7:
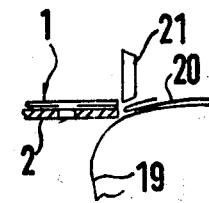

As is shown in FIG. 7, the folding edge is subsequently rolled-on by means of the stitching device with the same roller position as in the case of the procedure of the attachment of the breaker. This stitching can preferably be effected with a special stitching device, which is known as a 'static stitcher' and consists of five specially arranged rollers. The attachment procedure and the roll-on procedure can always be carried out with one building disc revolution and this operation is controlled automatically by the machine.

Apart from the advantage of an exact, centering of the breaker which is achieved in the above procedure, the building operation is speeded-up by the folding bag, and therefore folding bags in accordance with the invention lead to a simplification of the over-all construction, since no special restoring devices, auxiliary bag or the like are necessary.

Having now described my invention, what I claim is:

1. A folding device comprising a folding bag which is inflatable from a flattened, cylindrical shape to a toroidal shape, and is supported at least partially on a cylindrical support, a first end of the bag lying substantially flush with one end of the support, the bag being secured to the support at a point adjacent said end at a point intermediate the ends of the bag, the bag comprising an endless flexible-walled tube being covered on its inner periphery by a first reinforcing layer and on its outer periphery by a second reinforcing layer, each of said reinforcing layers comprising two layers of oppositely disposed bias-cut cord plies, the bias angle of the cords of the plies of the first reinforcing layer being greater than that of the second reinforcing layer and a restoring device secured to the end of the bag remote from said first end.

2. A folding device comprising a folding bag which is inflatable from a flattened, cylindrical shape to a toroidal shape and is supported at least partially on a cylindrical support, a first end of the bag lying substantially flush with one end of the support, the bag being secured to the support at a point adjacent said end and at a point intermediate the ends of the bag, the bag comprising an endless flexible-walled tube having being covered on its inner periphery by a first reinforcing layer and on its outer periphery by a second reinforcing layer, each of said reinforcing layers comprising two oppositely disposed bias-cut cord plies, the bias angle of the plies of the first reinforcing layer being about 88° and the bias angle of the plies of the second reinforcing layer being about 38°, and an elastic sleeve substantially coaxial with the bag and one end of which is attached to the free end of the bag.

3. A folding device as claimed in claim 1, wherein the bias angle of the plies of the first reinforcing layer is approximately 88° and that of the plies of the second reinforcing layer is approximately 38°.

4. A folding device in accordance with claim 1, wherein there is provided for the fixing of the bag at a point intermediate the ends of the bag a holding wire which is wound in the form of several windings in at least one layer around the first reinforcing layer.

5. A folding device in accordance with claim 1, wherein there is provided for the fixing of the bellows at the support end a clamping wire which is wound in the form of several windings around at least one ply of the first cord ply arrangement.

6. A folding device in accordance with claim 5, wherein the clamping wire embraces only the ply resting on the support and the end of this ply is folded over outwardly and is secured to the plies of the second reinforcing layer.

7. A folding device in accordance with claim 6, wherein a clamping band is provided at the fixed end of the bag, the clamping band being in engagement with the front surface and arranged to extend opposite the clamping wire at least over the axial length thereof and is secured to the cord plies surrounding the tube.

8. A folding device in accordance with claim 7, wherein the clamping band has an initial stretch of about 100%.

9. A folding device in accordance with claim 4, wherein the clamping band extends in the axial direction approximately as far as the centre of the region situated between the clamping wire and the holding wire.

10. A folding device in accordance with claim 9, where the bag is covered, at least on the region situated between fixed end and holding wire with a fabric having a low coefficient of friction.

11. A folding device in accordance with claim 1, wherein the second reinforcing layer is folded about the tube at the free end of the bag and is connected at the fixed end to the first reinforcing layer.

12. A folding device in accordance with claim 1, wherein the restoring device at the free end of the bag comprises at least one cylindrical elastic member which is secured on a part of its length to the bag and arranged to overlap the free end of the bag.

13. A folding device in accordance with claim 12, wherein the elastic member consists of rubber.

14. A folding device in accordance with claim 12, wherein a further cylindrical sleeve is secured on a part of its length to the restoring sleeve and is situated at the outer periphery of the free end of the cylindrical restoring sleeve.

15. A folding device in accordance with claim 4, wherein several compressed air connections are provided in the region between the clamping wire and holding wire.

16. A folding device in accordance with claim 1, wherein the cylindrical support is provided with a shoulder portion approximately in the region of the axial center of the support, the part having the smaller diameter being situated on the side of the free end of the bag.

17. A folding device in accordance with claim 4, wherein the clamping wire and the holding wire each comprise tire bead wire covered with rubber.

18. A folding device in accordance with claim 4, wherein the mutual spacing of the clamping wire and the holding wire is dimensioned in such a way that, with the bag pressurized, the point, referred to as the tilting point, corresponding to the highest point of the bag still lies within the region of the support in front of the frontal terminal plane or rolling edge.

* * * * *